(12) United States Patent
Komura et al.

(10) Patent No.: US 9,389,428 B2
(45) Date of Patent: Jul. 12, 2016

(54) THREE DIMENSIONAL IMAGE DISPLAY DEVICE

(71) Applicant: Japan Display Inc., Tokyo (JP)

(72) Inventors: Shinichi Komura, Mobara (JP);
Tatsuya Sugita, Takahagi (JP);
Shinichiro Oka, Hitachi (JP); Tomohiko Naganuma, Mobara (JP)

(73) Assignee: JAPAN DISPLAY INC., Tokyo (JP)

( * ) Notice: Subject to any disclaimer, the term of this patent is extended or adjusted under 35 U.S.C. 154(b) by 206 days.

(21) Appl. No.: 13/659,939

(22) Filed: Oct. 25, 2012

(65) Prior Publication Data

US 2013/0100365 A1   Apr. 25, 2013

(30) Foreign Application Priority Data

Oct. 25, 2011   (JP) ................. 2011-233775

(51) Int. Cl.
| | | |
|---|---|---|
| G02B 27/22 | (2006.01) | |
| H04N 13/04 | (2006.01) | |
| G02F 1/1347 | (2006.01) | |
| G02F 1/29 | (2006.01) | |

(52) U.S. Cl.
CPC ........ G02B 27/2214 (2013.01); G02F 1/13471 (2013.01); G02F 1/29 (2013.01); H04N 13/0409 (2013.01); G02F 2001/294 (2013.01)

(58) Field of Classification Search
CPC ........................ G02B 27/2214; H04N 13/0409
See application file for complete search history.

(56) References Cited

U.S. PATENT DOCUMENTS

| 6,118,584 A * | 9/2000 | Van Berkel et al. .......... 359/463 |
| 2005/0117216 A1* | 6/2005 | Lee ............................... 359/464 |
| 2008/0218855 A1* | 9/2008 | Van Berkel ................... 359/463 |
| 2010/0238276 A1 | 9/2010 | Takagi et al. |
| 2010/0259697 A1 | 10/2010 | Sakamoto et al. |

(Continued)

FOREIGN PATENT DOCUMENTS

| CN | 101859028 A | 10/2010 |
| CN | 201909923 U | 7/2011 |
| CN | 102207657 | 10/2011 |

(Continued)

OTHER PUBLICATIONS

Communicated dated Jul. 30, 2014, in connection with corresponding Chinese Patent Application No. 201210422959.5, an English translation thereof.

(Continued)

Primary Examiner — Jessica M Merlin
(74) Attorney, Agent, or Firm — Typha IP LLC

(57) ABSTRACT

It is an object to reduce 3D moiré and provide a higher-quality three dimensional image display device. The three dimensional image display device includes a display panel on which rows of pixels for right eye and rows of pixels for left eye are alternately arranged in a lateral direction, the display panel planarly displaying an image for three dimensional display, and a parallax forming liquid crystal panel for forming a parallax in an image for right eye and an image for left eye displayed by the display panel. Lateral direction center positions, which are vertexes of luminance in the lateral direction of an image for right eye and an image for left eye, where the image for three dimensional display is visually sensed through the parallax forming liquid crystal panel, are respectively positions shifted in the lateral direction in different positions in the screen longitudinal direction.

3 Claims, 16 Drawing Sheets

(56) References Cited

U.S. PATENT DOCUMENTS

| | | | | |
|---|---|---|---|---|
| 2011/0176074 | A1* | 7/2011 | Ge et al. | 349/15 |
| 2011/0242442 | A1* | 10/2011 | Lee et al. | 349/15 |

FOREIGN PATENT DOCUMENTS

| | | |
|---|---|---|
| JP | 10-505689 | 6/1998 |
| JP | 2857429 | 11/1998 |
| JP | 3426821 | 5/2003 |
| JP | 2006-106607 | 4/2006 |
| JP | 2010-008719 | 1/2010 |
| JP | 2010-224191 | 10/2010 |
| JP | 2010-249954 | 11/2010 |
| WO | WO 97/02709 | 1/1997 |

OTHER PUBLICATIONS

Office Action dated on Mar. 31, 2015 regarding a counterpart Chinese patent application No. 201210422959.5.

* cited by examiner

THREE DIMENSIONAL IMAGE DISPLAY DEVICE

CROSS-REFERENCE TO RELATED APPLICATION

The present application claims priority from Japanese application JP 2011-233775 filed on Oct. 25, 2011, the content of which is hereby incorporated by reference into this application.

BACKGROUND OF THE INVENTION

1. Field of the Invention

The present invention relates to a three dimensional image display device and, more particularly, to a three dimensional display device that makes use of a lenticular system or a parallax barrier system.

2. Description of the Related Art

As an example of a method of displaying a three dimensional image without using glasses, a lenticular system and a parallax barrier system are known. In the lenticular system, an image is set behind a lens called lenticular lens. The image includes images in a visual field from the right eye and images in a visual field from the left eye formed by longitudinally cutting, in strip shapes, which are alternately arranged. The lense is formed by laterally arranging semi-cylindrical lenses extending in the longitudinal direction. A user observes the image via the lenticular lens, whereby different images are provided to the right eye and the left eye to display a three dimensional image.

On the other hand, in the parallax barrier system, a plate having a plurality of thin slits in the longitudinal direction called parallax barrier is used instead of the lenticular lens. Different images are provided to the right eye and the left eye to display a three dimensional image.

JP 2010-224191 A discloses an example in which a lens of the lenticular system is realized by a liquid crystal lens. Japanese Patent No. 2857429 and Japanese Patent No. 3426821 disclose stereoscopic display performed by forming a parallax barrier using a liquid crystal display device or the like.

SUMMARY OF THE INVENTION

FIG. 20 is a diagram for explaining the principle of three dimensional display performed by using a liquid crystal lens. As shown in the figure, a three dimensional display device 800 using liquid crystal lens includes a liquid crystal display panel 831, a liquid crystal lens panel 900 arranged on a display side of the liquid crystal display panel 831 and configured to form a parallax in a two dimensional image displayed by the liquid crystal display panel 831, and a backlight unit 832 functioning as a light source arranged on the other side opposite to the liquid crystal lens panel 900 side of the liquid crystal display panel 831 and configured to emit light in the direction to the liquid crystal display panel 831 and the liquid crystal lens panel 900.

The liquid crystal display panel 831 includes, in order from the backlight unit 832 side, a first sheet polarizer 841 configured to allow only a polarized component of light in one direction to pass, a first glass substrate 842, on the surface of which thin-film transistors and the like explained below are formed, a pixel layer 850 forming pixels in a matrix shape, a second glass substrate 843 on which a color filter of the pixel layer 850 is formed, and a second sheet polarizer 844 having a transmitted polarized component in a direction perpendicular to the direction of a transmitted polarized component of the first sheet polarizer 841. Here, the pixels formed in the pixel layer 850 include the thin-film transistors formed on the first glass substrate 842, the color filter formed on the second glass substrate 843, and a liquid crystal composition sealed between the thin-film transistors and the color filter.

The liquid crystal lens panel 900 includes a stripe electrode substrate 910 including stripe electrodes 950 arranged on a third glass substrate 912, a plane electrode substrate 904 including a plane electrode 906 arranged on a fourth glass substrate 905, and a liquid crystal layer 918 sealed between the stripe electrode substrate 910 and the plane electrode substrate 904.

In the pixel layer 850, pixels for left eye 851 and pixels for right eye 852 are alternately arranged in a screen lateral direction. Lights emitted from the respective pixels form a parallax of a right eye image and a left eye image with a lens formed by a liquid crystal layer 918 oriented by an electric field generated from a potential difference between the stripe electrodes 950 and the plane electrode 906 of the liquid crystal lens panel 900.

FIG. 21 is a diagram schematically showing a part of the pixel layer 850 and the stripe electrodes 950 in a visual field from the front of a screen. As shown in the figure, a row R of the pixels for right eye 852 and a row L of the pixels for left eye 851 are arranged between the stripe electrodes 950. A black matrix B for preventing a light leak between pixels is formed between the row R of the pixels for right eye 852 and the row L of the pixels for left eye 851.

In FIG. 22, a graph showing a distribution of luminance obtained when an image displayed on the three dimensional display device 800 is viewed from an observer side is shown. As shown in the graph, luminance R15 of light from the pixel for right eye 852 is high when luminance L15 of light from the pixel for left eye 851 is the lowest. The luminance L15 of the light from the pixel for left eye 851 is high when the luminance R15 of the light from the pixel for right eye 852 is the lowest. Average luminance A15 is low in a region M15 in the graph. A luminance difference D15 occurs as a difference between the average luminance A15 and a maximum value of luminance.

Because of the luminance difference D15, when the eyes of the observer move in the lateral direction, high-luminance portions and low-luminance portions are alternately observed and vertical stripes (hereinafter referred to as "3D moiré") are seen in an image. As a result, the quality of a three dimensional image is deteriorated.

The present invention has been devised in view of the above circumstances and it is an object of the present invention to reduce 3D moiré and provide a higher-quality three dimensional image display device.

A three dimensional display device according to the present invention includes: a display panel on which rows of pixels for right eye and rows of pixels for left eye extending in a screen longitudinal direction are alternately arranged in a screen lateral direction, the display panel planarly displaying an image for three dimensional display using the rows of the pixels for right eye and the rows of the pixels for left eye; and a parallax forming liquid crystal panel arranged in parallel to the display panel on a display direction side of the display panel and for forming a parallax in an image of the rows of the pixels for right eye and an image of the rows of the pixels for left eye displayed by the display panel. Lateral direction center positions, which are vertexes of luminance in the lateral direction of an image of the pixels for right eye and an image of the pixels for left eye, where the image for three dimensional display is visually sensed through the parallax forming liquid crystal panel, are respectively positions shifted in the lateral direction in different positions in the screen longitudinal direction.

In the parallax forming liquid crystal panel of the three-dimensional display device according to the present invention, an electrode for orienting liquid crystal extending in a belt shape in the screen longitudinal direction and provided in parallel to the screen lateral direction may be bent.

In the three dimensional display device according to the present invention, the parallax forming liquid crystal panel can form a lenticular lens by orienting liquid crystal and form a parallax in the image for three dimensional display.

In the three dimensional display device according to the present invention, the parallax forming liquid crystal panel may form a parallax in the image for three dimensional display by orienting the liquid crystal to thereby form a parallax barrier.

In the three dimensional display device according to the present invention, the display panel may be a liquid crystal display panel configured to perform display by controlling the orientation of a liquid crystal composition. Lateral direction positions of two sides forming longitudinal direction ends of a pixel shape of the liquid crystal display panel may be different from each other.

In the three dimensional display device according to the present invention, the pixel shape may be a parallelogram.

In the three dimensional display device according to the present invention, the pixel shape may be an electrode shape of the liquid crystal display panel.

In the three dimensional display device according to the present invention, the pixel shape may be a shape of color filters of the liquid crystal display panel.

DETAILED DESCRIPTION OF THE INVENTION

Figure 1:
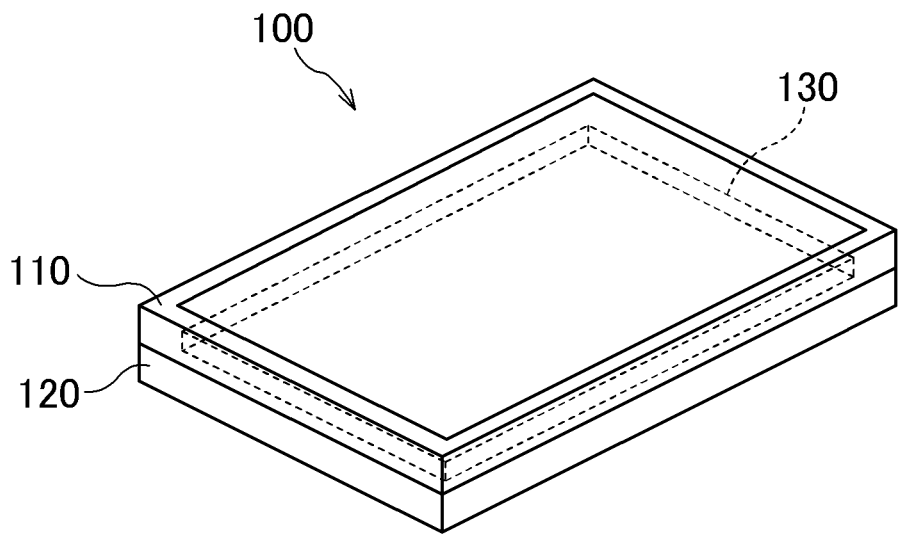
FIG. 1 is a diagram schematically showing a three dimensional display device according to a first embodiment of the present invention.

First to fifth embodiments of the present invention are explained below with reference to the accompanying drawings. In the drawings, the same or equivalent components are denoted by the same reference numerals and signs and redundant explanation of the components is omitted.

First Embodiment

In FIG. 1, a three dimensional display device 100 according to a first embodiment of the present invention is schematically shown. As shown in the figure, the three dimensional display device 100 includes a liquid crystal module 130 fixed to be held between an upper frame 110 and a lower frame 120 and a not-shown power supply device.

Figure 2:
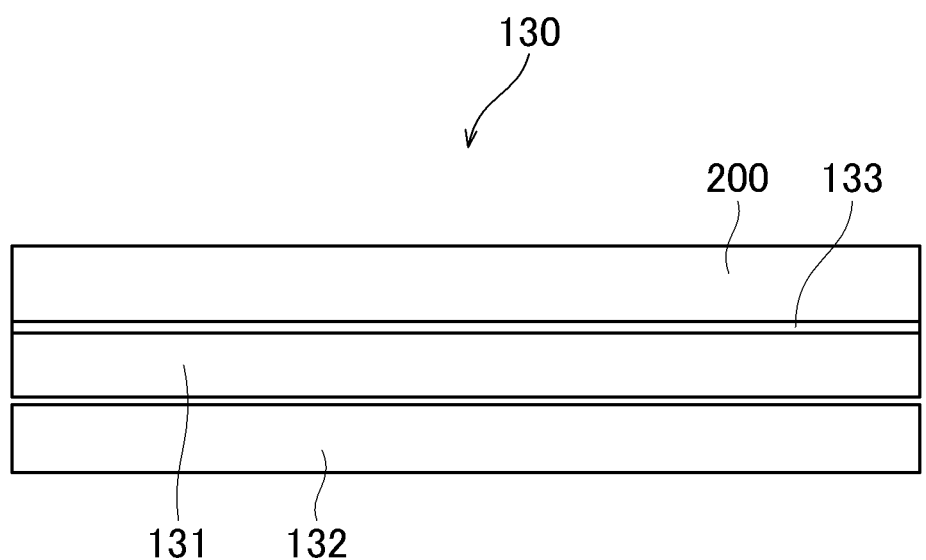
FIG. 2 is a diagram showing the configuration of a liquid crystal module shown in FIG. 1.

In FIG. 2, the configuration of the liquid crystal module 130 is shown. The liquid crystal module 130 includes a liquid crystal display panel 131 functioning as a display panel configured to receive an input of a video signal to thereby transmit light corresponding to an image of the video signal and display a two dimensional image, a liquid crystal lens panel 200 capable of functioning as a lens by controlling the orientation of a liquid crystal composition on the inside thereof in order to form a parallax in the image displayed by the liquid crystal display panel 131, and a backlight unit 132 configured to irradiate light on the liquid crystal display panel 131 and the liquid crystal lens panel 200 and cause the liquid crystal display panel 131 and the liquid crystal lens panel 200 to display the image on liquid crystal display surfaces thereof. The liquid crystal display panel 131 and the liquid crystal lens panel 200 are bonded by a bonding layer 133.

In this embodiment, the liquid crystal display panel is used as the display panel. However, the display panel may be a display device such as an organic EL display device or a field emission display device (FED) other than the liquid crystal display panel.

Figure 3:
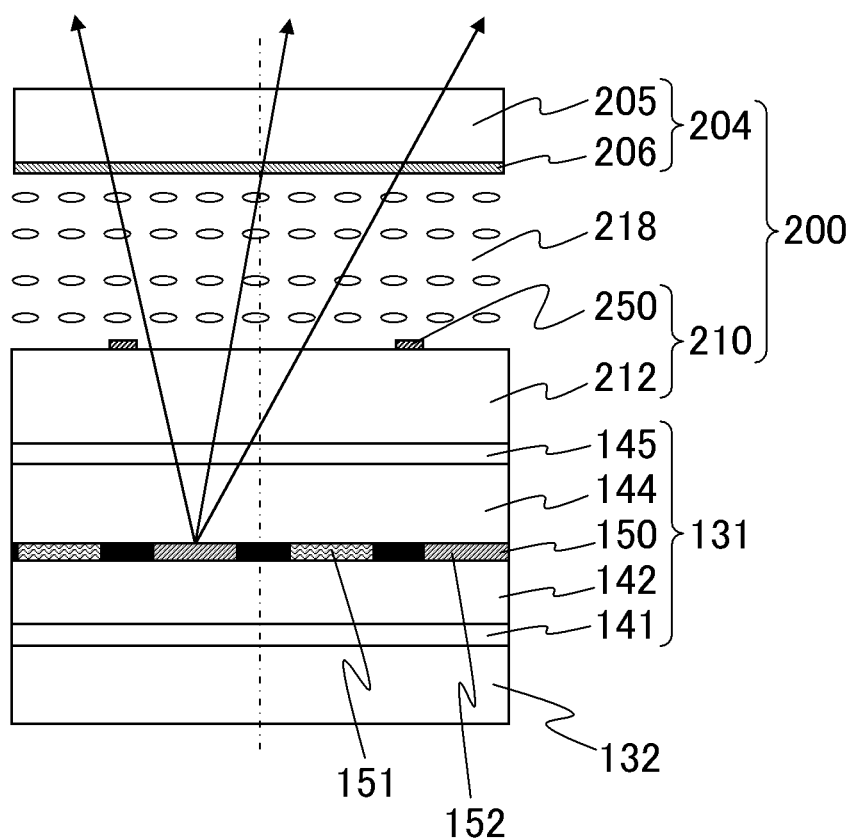
FIG. 3 is a diagram showing two dimensional display performed in the liquid crystal module shown in FIG. 2.
Figure 4:
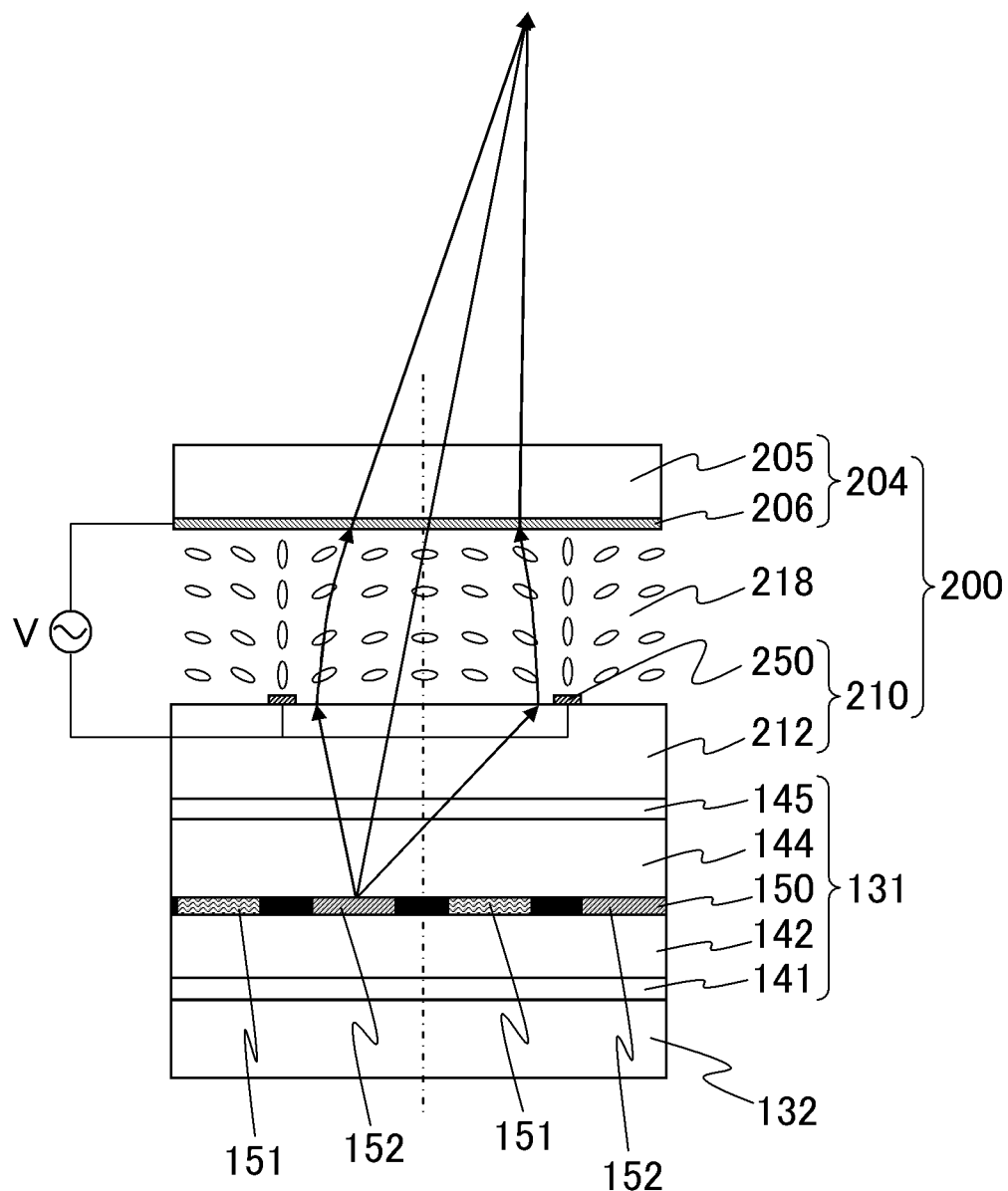
FIG. 4 is a diagram showing three dimensional display performed in the liquid crystal module shown in FIG. 3.

FIGS. 3 and 4 are diagrams for explaining a principle of performing three dimensional display using the liquid crystal module 130. The liquid crystal module 130 includes the liquid crystal display panel 131, the liquid crystal lens panel 200 arranged in a display direction of the liquid crystal display panel 131 and capable of forming a parallax in a two dimensional image displayed by the liquid crystal display panel 131, and the backlight unit 132 functioning as a light source arranged on the other side opposite to the liquid crystal lens panel 200 side of the liquid crystal display panel 131 and configured to emit light in the direction to the liquid crystal display panel 131 and the liquid crystal lens panel 200.

The liquid crystal display panel 131 includes, in order from the backlight unit 132 side, a first sheet polarizer 141 configured to allow only a polarized component of light in one direction to pass, a first glass substrate 142, on a surface of which thin-film transistors and the like explained below are formed, a pixel layer 150 forming pixels in a matrix shape, a second glass substrate 144 on which a color filter of the pixel layer 150 is formed, and a second sheet polarizer 145 having a transmitted polarized component in a direction orthogonal to the direction of a transmitted polarized component of the first sheet polarizer 141. Here, the pixels formed in the pixel layer 150 include the thin-film transistors formed on the first glass substrate 142, the color filter formed on the second glass substrate 144, and a liquid crystal composition sealed between the thin-film transistors and the color filter.

The liquid crystal lens panel 200 includes a stripe electrode substrate 210 including stripe electrodes 250 arranged on a third glass substrate 212, a plane electrode substrate 204 including a plane electrode 206 arranged on a fourth glass substrate 205, and a liquid crystal layer 218 sealed between the stripe electrode substrate 210 and the plane electrode substrate 204.

FIG. 3 shows a state during two dimensional display in which the liquid crystal composition of the liquid crystal layer 218 is not oriented. In the pixel layer 150, pixels for left eye 151 and pixels for right eye 152 are alternately arranged in a screen lateral direction. However, as an image displayed by the liquid crystal display panel 131, a two dimensional image is displayed irrespective of the pixels for left eye 151 and the pixels for right eye 152. Lights emitted from the pixels linearly pass through the liquid crystal lens panel.

FIG. 4 shows three dimensional display performed in the liquid crystal module 130 shown in FIG. 3. In this case, an image for the left eye and an image for the right eye are respectively displayed on the pixels for left eye 151 and the pixels for right eye 152 of the liquid crystal display panel 131. A potential difference occurs between the stripe electrodes 250 and the plane electrode 206 of the liquid crystal lens panel 200. Consequently, the liquid crystal composition of the liquid crystal layer 218 is oriented to form a lens and a parallax is caused in the left eye images and the right eye images, whereby three dimensional display is performed.

Figure 5:
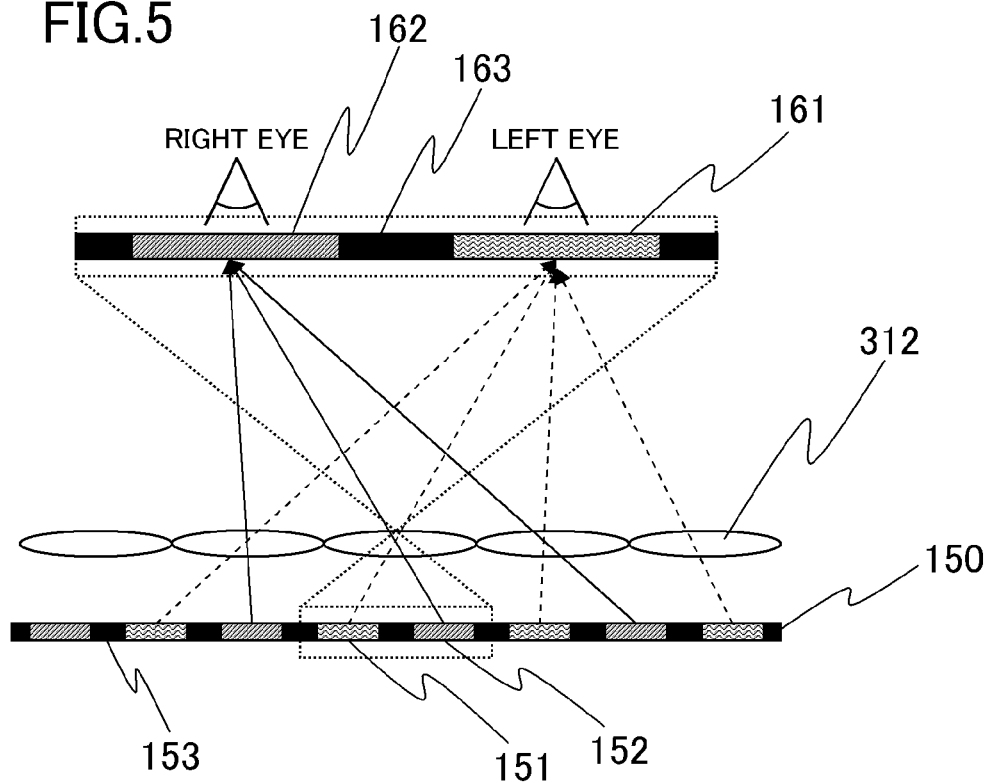
FIG. 5 is a diagram for explaining an image of pixels for right eye and an image of pixels for left eye in which a parallax is formed by a liquid crystal lens.
Figure 6:
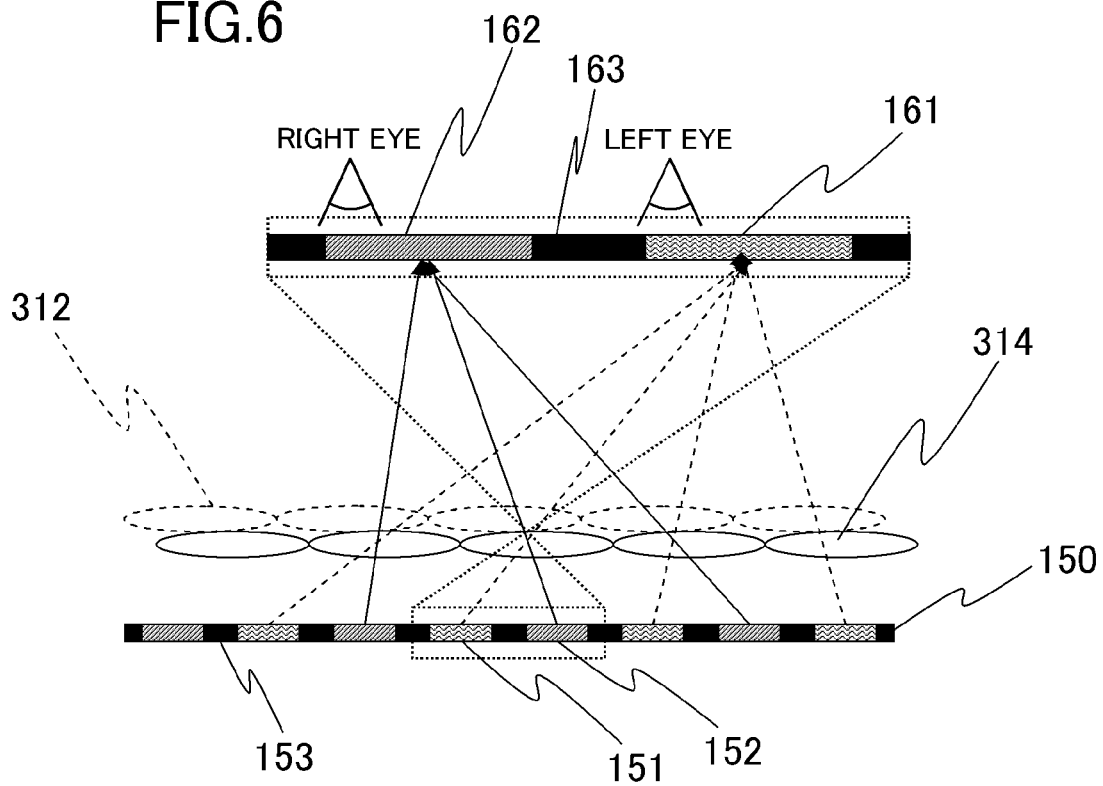
FIG. 6 is a diagram for explaining an image of the pixels for right eye and an image of the pixels for left eye formed when the position of the liquid crystal lens is shifted.

FIGS. 5 and 6 are diagrams for explaining images of the pixels for right eye and the pixels for left eye in which a parallax is formed by the liquid crystal lens. As shown in FIG. 5, lights emitted from the pixels for left eye 151 form an image 161 of the pixels for left eye in the position of the left eye through a liquid crystal lens 312. Lights emitted from the pixels for right eye 152 form an image 162 of the pixels for right eye in the position of the right eye through the liquid crystal lens 312. A black matrix image 163 by black matrixes 153 is formed between the images 161 and 162. When the eyes of an observer move in the lateral direction, high-luminance portions and low-luminance portions are alternately observed, causing 3D moiré.

As shown in FIG. 6, when a liquid crystal lens 314 in which the position of the liquid crystal lens 312 is shifted is assumed, the positions of the image 161 of the pixels for left eye, the image 162 of the pixels for right eye, and the black matrix image 163, i.e., the 3D moiré moves in a direction in which the liquid crystal lens is shifted. The three dimensional display device 100 according to the present invention reduces the 3D moiré making use of this phenomenon.

Figure 7:
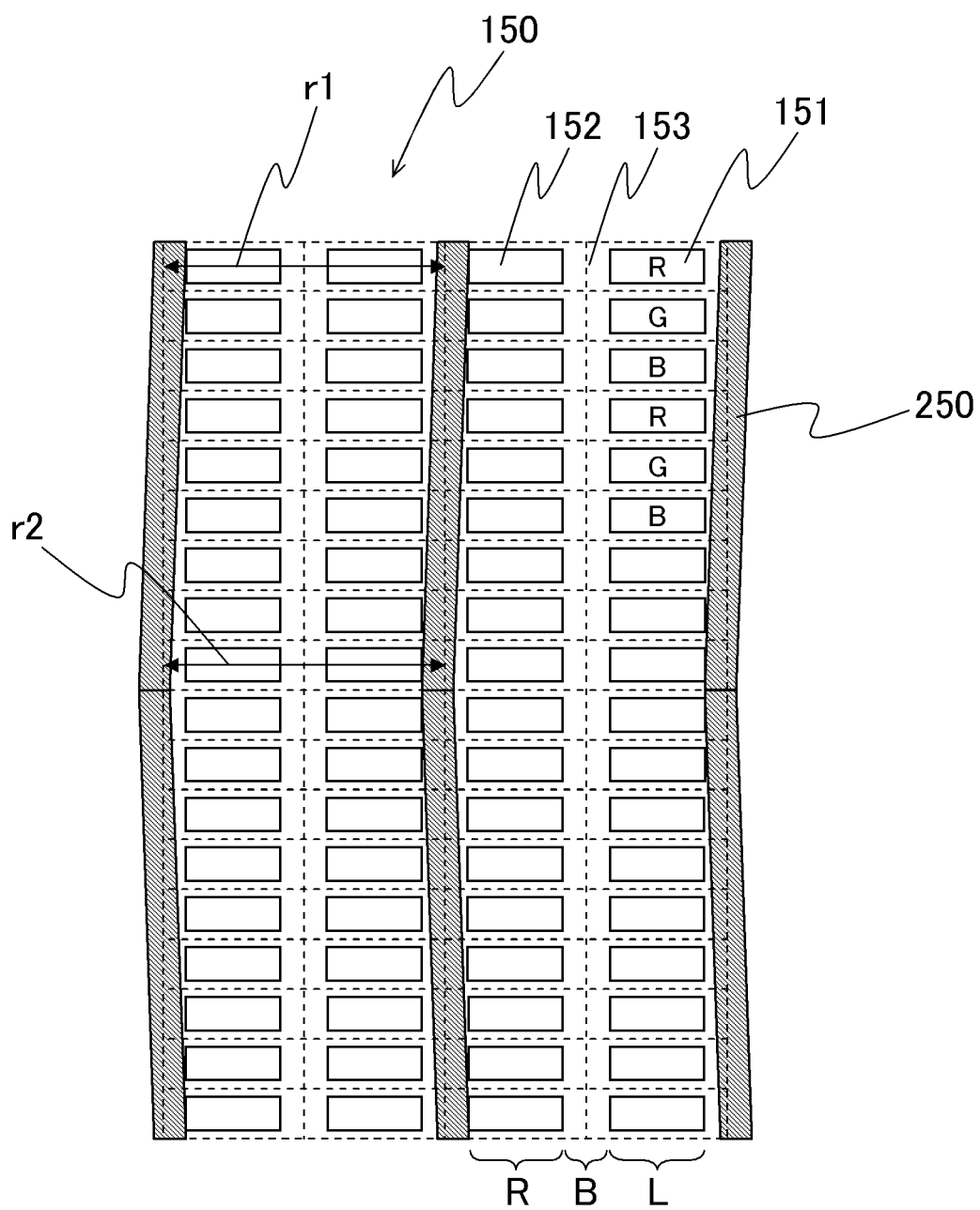
FIG. 7 is a diagram schematically showing a part of a pixel layer and stripe electrodes according to the first embodiment in a visual field from the front of a screen.

FIG. 7 is a diagram schematically showing a part of the pixel layer 150 and the stripe electrodes 250 according to the first embodiment in a visual field from the front of the screen. As shown in the figure, in the pixels for left eye 151 and the pixels for right eye 152, one pixel includes sub-pixels of R (red), G (green), and B (blue). The sub-pixels of R (red), G (green), and B (blue) are arranged in order in a screen longitudinal direction. The stripe electrodes 250 are arranged to hold the pixels for left eye 151 and the pixels for right eye 152 therebetween. The stripe electrodes 250 are arranged to be bent in every three pixels, i.e., nine sub-pixels. Although the stripe electrodes 250 are bent in every three pixels (nine sub-pixels) herein, the stripe electrodes 250 may be bent in every number of pixels other than three.

Figure 8:
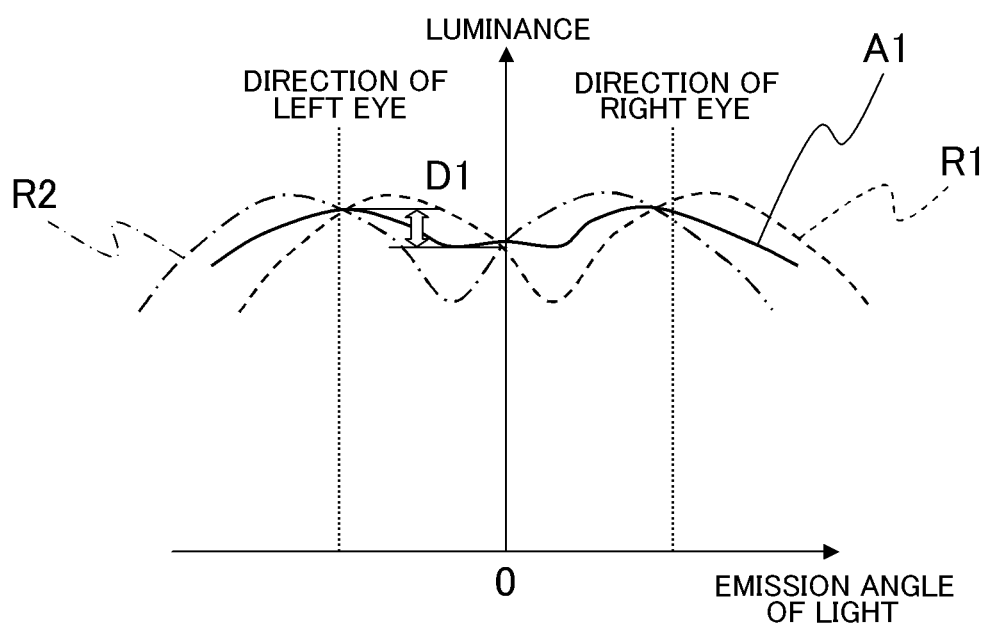
FIG. 8 is a graph showing luminance R1 of light emitted from a region r1 of a pixel for left eye and a pixel for right eye shown in FIG. 7 and luminance R2 of light emitted from a region r2 of a pixel for left eye and a pixel for right eye shown in FIG. 7.

FIG. 8 is a graph showing luminance R1 of light emitted from a region r1 of the pixel for left eye 151 and the pixel for right eye 152 shown in FIG. 7 and luminance R2 of light emitted from a region r2 of the pixel for left eye 151 and the pixel for right eye 152 shown in FIG. 7. As shown in the graph, the luminance R1 and the luminance R2 have peaks in positions where emission angles are different. A luminance difference D1 can be further reduced at average luminance A1 of the luminance R1 and the luminance R2. In other words, center positions in the lateral direction, which are vertexes of luminance in the lateral direction of an image of the pixels for right eye and an image of the pixels for left eye, are respectively positions different in the lateral direction in different positions in the screen longitudinal direction. Therefore, with the three dimensional display device according to the first embodiment, it is possible to reduce 3D moiré in three dimensional image display.

Figure 9:
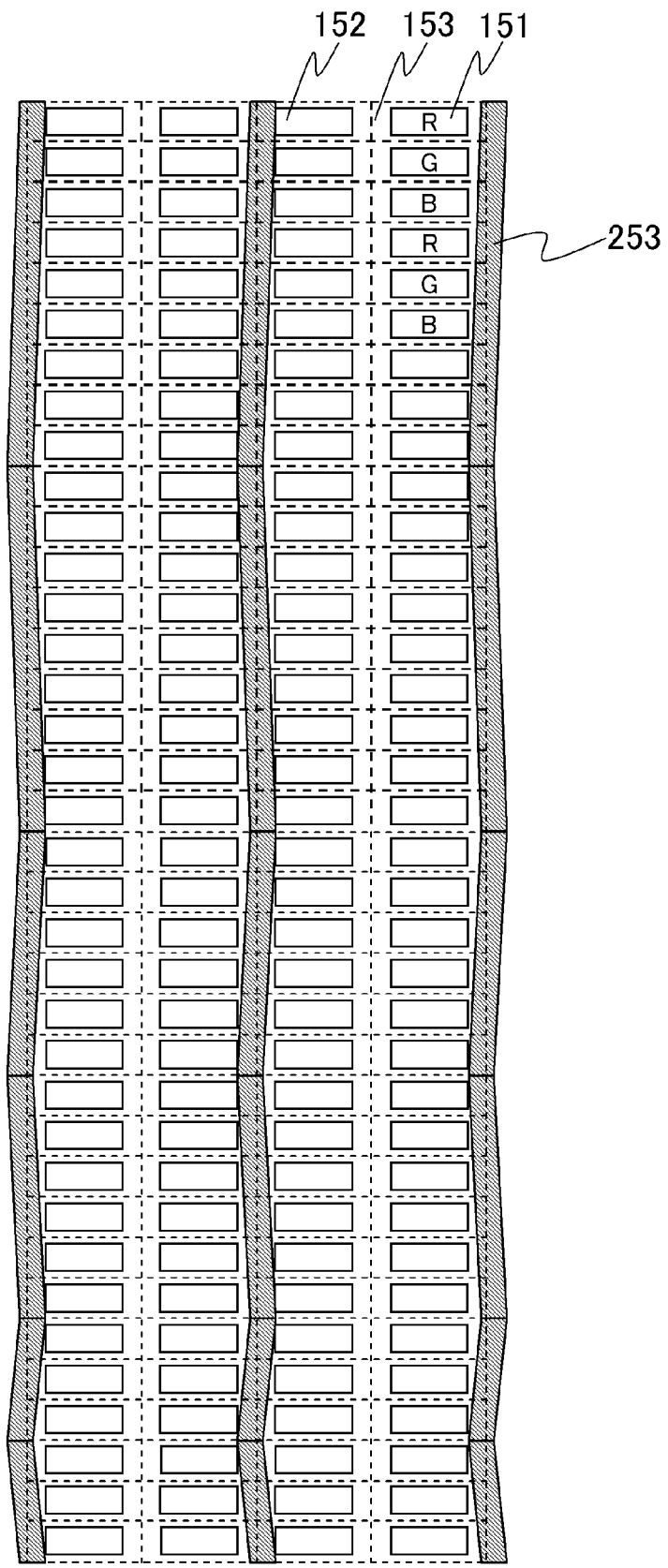
FIG. 9 is a diagram showing a modification of the first embodiment in a visual field same as the visual field shown in FIG. 7.

FIG. 9 is a diagram showing a modification of the first embodiment in a visual field same as the visual field shown in FIG. 7. This modification is different from the first embodiment in that the liquid crystal lens panel 200 includes stripe electrodes 253. First bending of the stripe electrodes 253 is performed in every nine sub-pixel. Second bending of the stripe electrodes 253 is performed in every six sub-pixels. Third bending of the stripe electrodes 253 is performed in every three sub-pixels. A period of the bending varies. Even if stripe electrodes having two or more kinds of bending periods are used in this way, as in the first embodiment, it is possible to reduce 3D moiré in the three dimensional image display.

Second Embodiment

Figure 10:
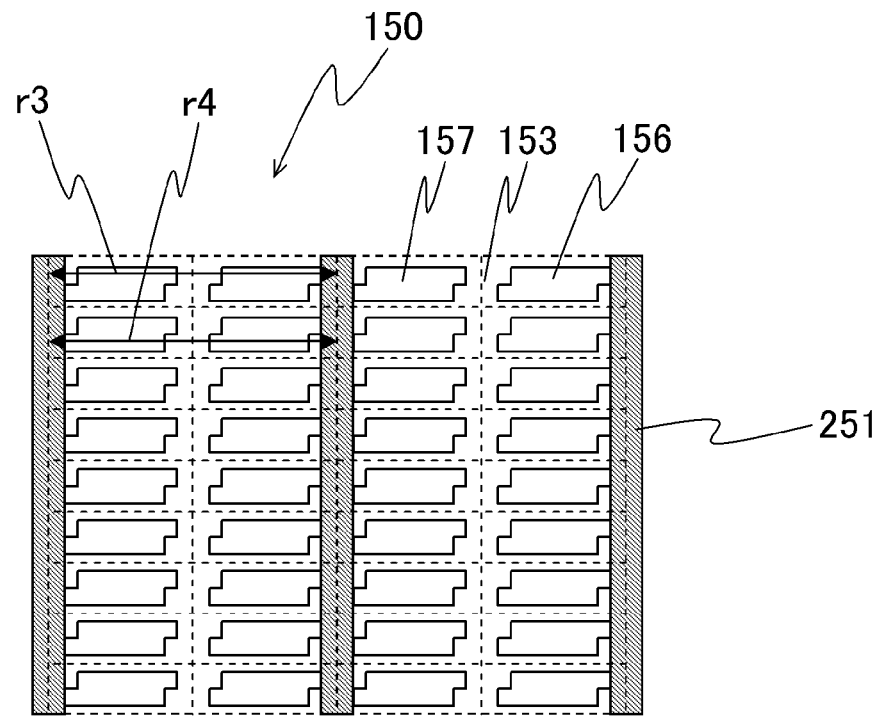
FIG. 10 is a diagram schematically showing a part of a pixel layer and stripe electrodes according to a second embodiment in a visual field from the front of a screen.

A second embodiment of the present invention is explained. The configuration of a three dimensional display device according to the second embodiment is the same as the configuration shown in FIGS. 1 to 4 in the first embodiment. Therefore, redundant explanation of the configuration is omitted. FIG. 10 is a diagram schematically showing a part of the pixel layer 150 and stripe electrodes 251 according to the second embodiment in a visual field from the front of a screen. As shown in FIG. 10, in this embodiment, the stripe electrodes 251 are linear and not bent. Instead, the shape of respective electrodes of pixels for left eye 156 and pixels for right eye 157 is a shape obtained by shifting laterally-long upper and lower rectangles from each other in the lateral direction and combining the rectangles. Lateral direction positions of two sides forming longitudinal direction ends of a pixel shape are different from each other. Sides forming lateral direction ends are bent in a hook shape. Such a pixel shape may be formed by an electrode shape of the liquid crystal display panel 131, may be formed by a color filter shape, or may be formed by both of the electrode shape and the color filter shape.

Figure 11:
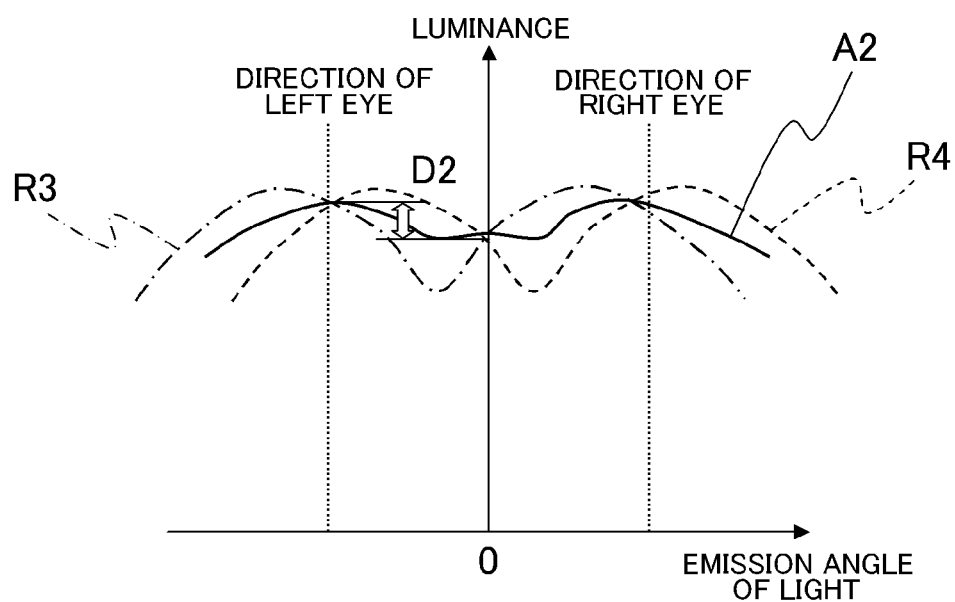
FIG. 11 is a graph showing luminance R3 of light emitted from a region r3 in an upper part of a pixel for left eye and a pixel for right eye shown in FIG. 10 and luminance R4 of light emitted from a region r4 in a lower part of a pixel for left eye and a pixel for right eye shown in FIG. 10.

FIG. 11 is a graph showing luminance R3 of light emitted from a region r3 in an upper part of the pixel for left eye 156 and the pixel for right eye 157 shown in FIG. 10 and luminance R4 of light emitted from a region r4 in a lower part of the pixel for left eye 156 and the pixel for right eye 157 shown in FIG. 10. As shown in the graph, the luminance R3 and the luminance R4 have peaks in positions where emission angles are different. A luminance difference D2 can be further reduced at average luminance A2 of the luminance R3 and the luminance R4.

Therefore, even if the pixel shape is the shape in which the lateral direction positions of the two sides forming the longitudinal direction ends are different as shown in FIG. 10, left and right positions of lights emitted from upper parts of the pixels and lights emitted from lower parts of the pixels are different. Therefore, it is possible to obtain effects same as the effects obtained when the liquid crystal lens is shifted to the left and right. In other words, center positions in the lateral direction, which are vertexes of luminance in the lateral direction of an image of the pixels for right eye and an image of the pixels for left eye, are respectively positions different in the lateral direction in different positions in the screen longitudinal direction. Therefore, with the three dimensional display device according to the second embodiment, it is possible to reduce 3D moiré in three dimensional image display.

Third Embodiment

Figure 12:
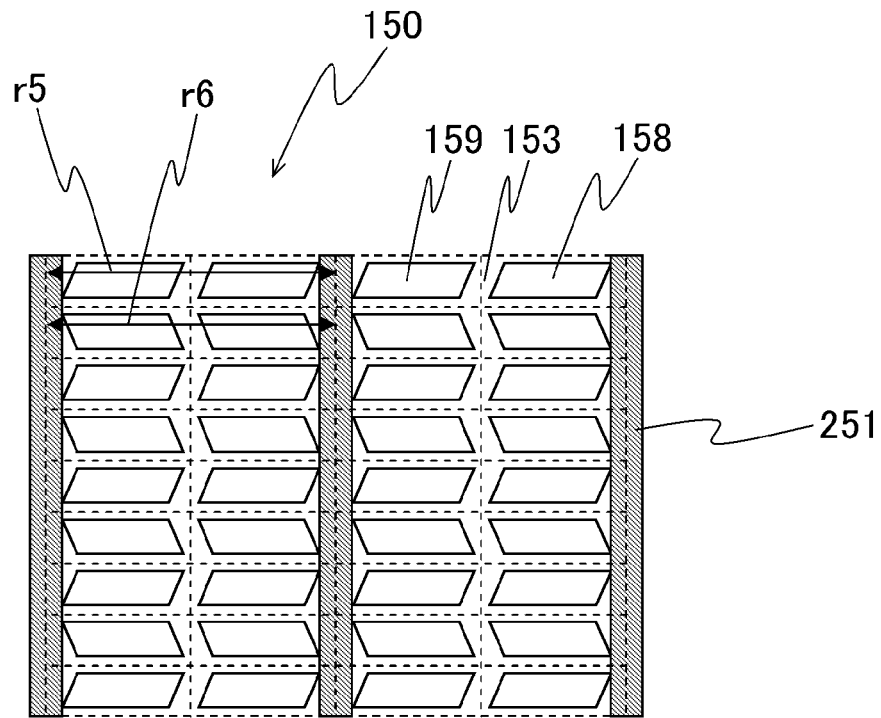
FIG. 12 is a diagram schematically showing a part of a pixel layer and stripe electrodes according to a third embodiment in a visual field from the front of a screen.

A third embodiment of the preset invention is explained. The configuration of a three dimensional display device according to the third embodiment is the same as the configuration shown in FIGS. 1 to 4 in the first embodiment. Therefore, redundant explanation of the configuration is omitted. FIG. 12 is a diagram schematically showing a part of the pixel layer 150 and the stripe electrodes 251 according to the third embodiment in a visual field from the front of a screen. As shown in FIG. 12, in this embodiment, as in the second embodiment, the stripe electrodes 251 are linear and not bent. Instead, the shape of the respective electrodes of pixels for left eye 158 and pixels for right eye 159 is a substantial parallelogram. As the parallelograms, parallelograms extending obliquely right upward and parallelograms extending obliquely left upward are alternately arranged in the longitudinal direction. Lateral direction positions of two sides forming longitudinal direction ends of a pixel shape are different from each other. Sides forming lateral direction ends extend obliquely. In this embodiment, the parallelograms extending obliquely right upward and the parallelograms extending obliquely left upward are alternately arranged in the longitudinal direction. However, only one kind of parallelograms may be arranged or three or more kinds of parallelograms may be arranged in order.

Figure 13:
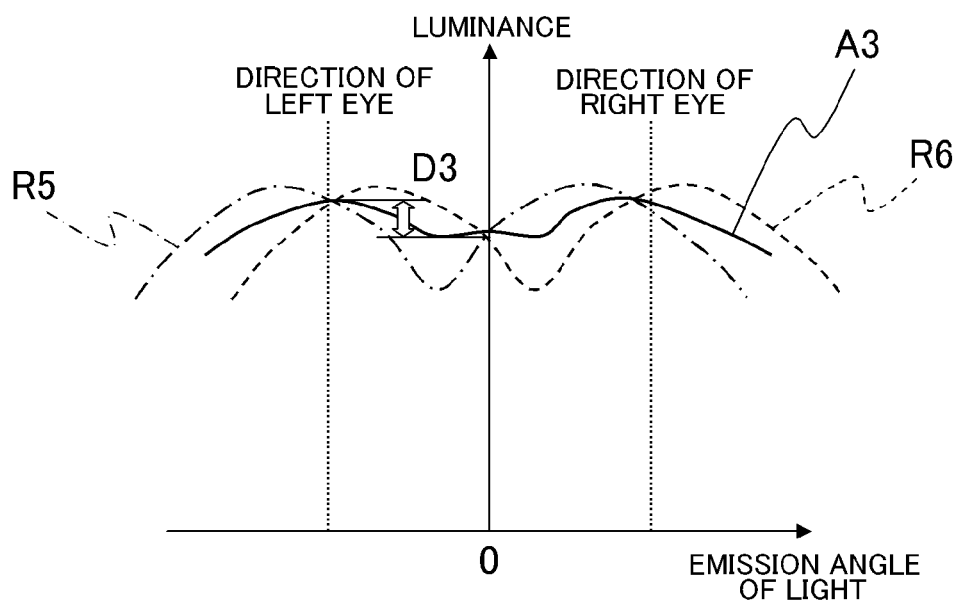
FIG. 13 is a graph showing luminance R5 of light emitted from a region r5 in an upper part of parallelogram pixels extending obliquely right upward shown in FIG. 12 and luminance R6 of light emitted from a region r6 in a lower part of parallelogram pixels extending obliquely left upward shown in FIG. 12.

FIG. 13 is a graph showing luminance R5 of light emitted from a region r5 in an upper part of the parallelogram pixels 158 and 159 extending obliquely right upward shown in FIG. 12 and luminance R6 of light emitted from a region r6 in a lower part of the parallelogram pixels 158 and 159 extending obliquely left upward shown in FIG. 12. As shown in the graph, the luminance R5 and the luminance R6 have peaks in positions where emission angles are different. A luminance difference D3 can be further reduced at average luminance A3 of the luminance R5 and the luminance R6.

Therefore, even if the pixel shape is the shape in which the lateral direction positions of the two sides forming the longitudinal direction ends are different as shown in FIG. 12, left and right positions of lights emitted from upper parts of the pixels and lights emitted from lower parts of the pixels are different. Therefore, it is possible to obtain effects same as the effects obtained when the liquid crystal lens is shifted to the left and right. In other words, center positions in the lateral direction, which are vertexes of luminance in the lateral direction of an image of the pixels for right eye and an image of the pixels for left eye, are respectively positions different in the lateral direction in different positions in the screen longitudinal direction. Therefore, with the three dimensional display device according to the third embodiment, it is possible to reduce 3D moiré in three dimensional image display.

Figure 14:
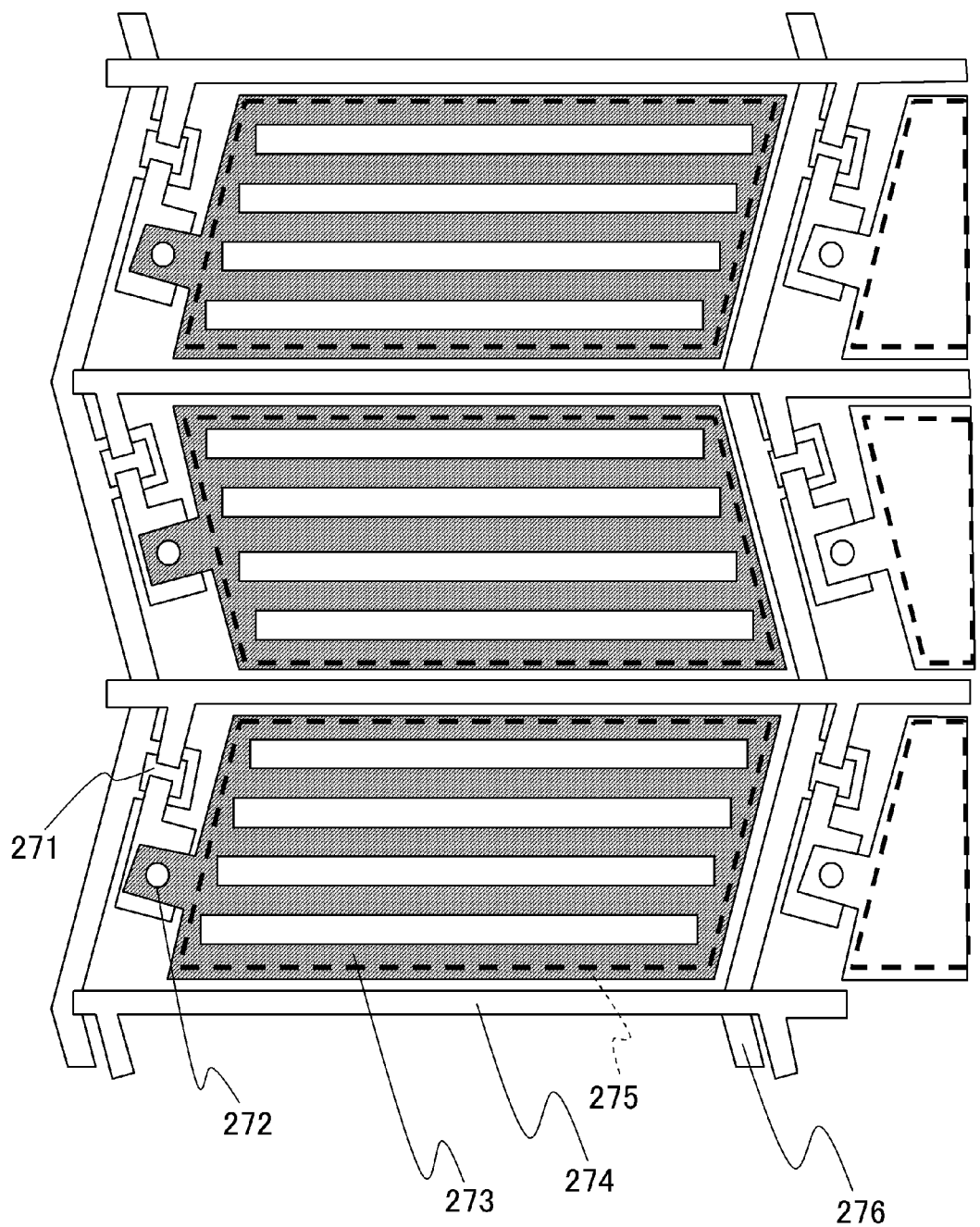
FIG. 14 is a diagram schematically showing an electrode film forming a thin-film transistor formed on a glass substrate in the third embodiment.

FIG. 14 is a diagram schematically showing an electrode film forming a thin-film transistor formed on the first glass substrate 142 in this embodiment. As shown in the figure, the thin-film transistor formed on the first glass substrate 142 includes a drain line 274 to which a voltage corresponding to a gradation value is applied, a pixel electrode 273 connected to a source of the transistor via a contact hole 272, a gate line 276, and a semiconductor film 271. In the figure, a transmission area 275 of a color filter is indicated by a broken line. As shown in the figure, the pixel electrode 273 has an interdigital shape and assumes a parallelogram as a whole. Therefore, when a voltage is applied to the pixel electrode 273, orientation of a liquid crystal composition occurs in an area of the parallelogram. Further, since the transmission area 275 of the color filter is a parallelogram similar to the pixel electrode 273, a pixel shape is defined by the pixel electrode 273 and the transmission area 275 of the color filter. The transmission area 275 of the color filter is an area surrounded by a black matrix. The transmission area 275 is defined by the black matrix. In this embodiment, the pixel shape is formed by both of the electrode shape and the color filter shape. However, the pixel shape may be formed only by the electrode shape of the liquid crystal display panel 131 or may be formed only by the color filter shape.

Fourth Embodiment

A fourth embodiment of the present invention is explained. The configuration of a three dimensional display device according to the fourth embodiment is the same as the configuration shown in FIGS. 1 and 2 in the first embodiment.

Figure 15:
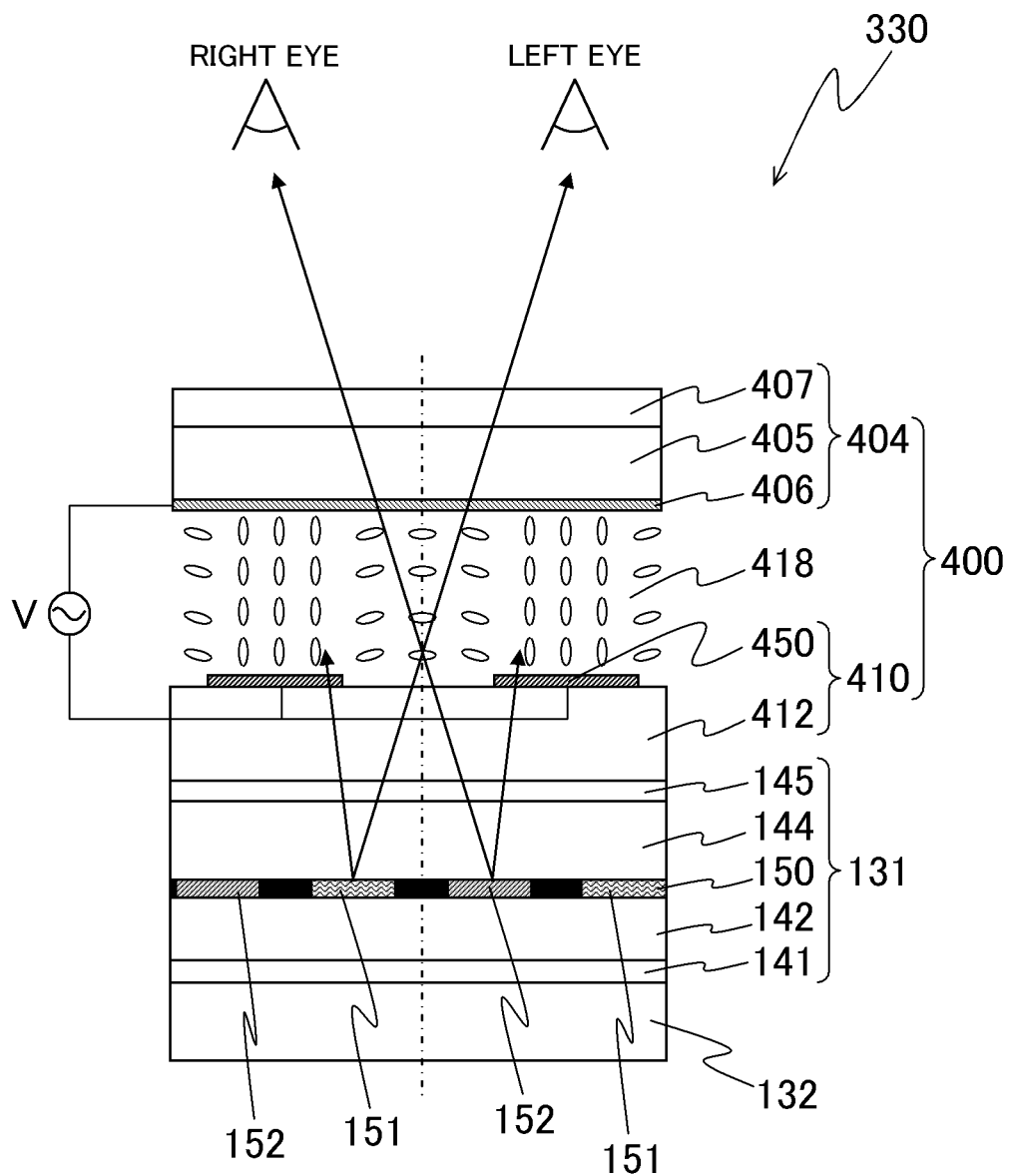
FIG. 15 is a diagram for explaining a principle of performing three dimensional display using a liquid crystal module according to a fourth embodiment.

Therefore, redundant explanation of the configuration is omitted. FIG. 15 is a diagram for explaining a principle of performing three dimensional display using a liquid crystal module 330. The liquid crystal module 330 includes the liquid crystal display panel 131, a liquid crystal barrier panel 400 arranged in a display direction of the liquid crystal display panel 131 and configured to form a parallax in a two dimensional image displayed by the liquid crystal display panel 131, and the backlight unit 132 arranged on the other side opposite to the liquid crystal barrier panel 400 side of the liquid crystal display panel 131 and configured to emit light in the direction to the liquid crystal display panel 131 and the liquid crystal barrier panel 400. The configuration of the liquid crystal display panel 131 and the backlight unit 132 is the same as the configuration shown in FIG. 4 in the first embodiment. Therefore, explanation of the liquid crystal display panel 131 and the backlight unit 132 is omitted.

The liquid crystal barrier panel 400 includes a barrier electrode substrate 410 including barrier electrodes 450 arranged on a third glass substrate 412, a plane electrode substrate 404 including a plane electrode 406 on one surface on a fourth glass substrate 405 and including a third sheet polarizer 407 on the other surface, and a liquid crystal layer 418 sealed between the barrier electrode substrate 410 and the plane electrode substrate 404.

FIG. 15 shows three dimensional display performed in the liquid crystal module 330. In this case, an image for the left eye and an image for the right eye are displayed on the pixels for left eye 151 and the pixels for right eye 152 of the liquid crystal display panel 131. A potential difference occurs between the barrier electrodes 450 and the plane electrode 406 of the liquid crystal barrier panel 400. Consequently, a liquid crystal composition of the liquid crystal layer 418 is oriented and light is not transmitted through the liquid crystal layer 418. A parallax is caused in the left eye image and the right eye image, whereby three dimensional display is performed.

Figure 16:
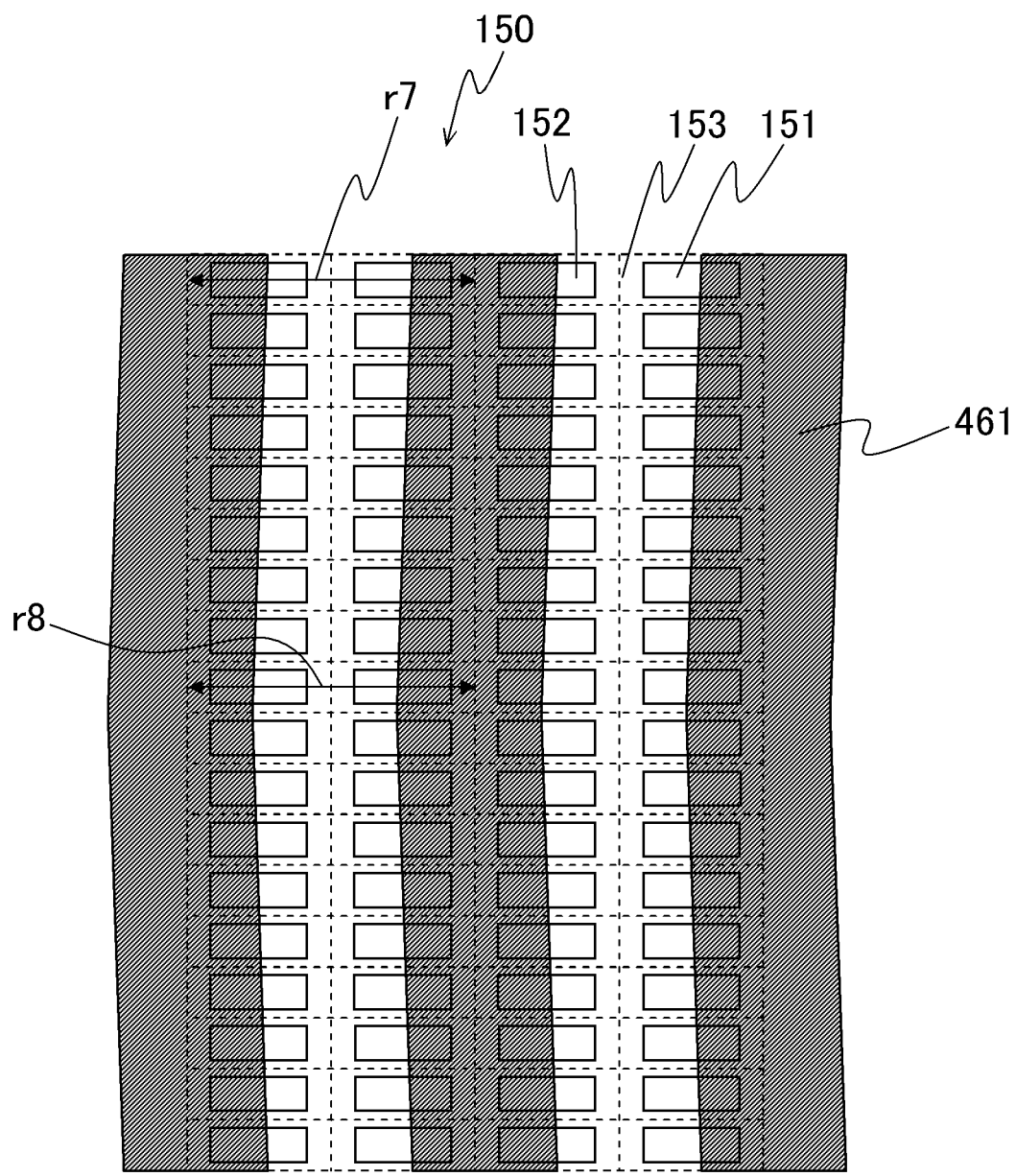
FIG. 16 is a diagram schematically showing a part of a pixel layer and barriers formed by barrier electrodes according to the fourth embodiment in a visual field from the front of a screen.

FIG. 16 is a diagram schematically showing a part of the pixel layer 150 and barriers 461 formed by the barrier electrodes 450 according to the fourth embodiment. As shown in FIG. 16, the configuration of the pixels for left eye 151 and the pixels for right eye 152 is the same as the configuration shown in FIG. 7 in the first embodiment. The barrier electrodes 450 are arranged to hold the pixels for left eye 151 and the pixels for right eye 152 therebetween and cover a part of the pixels. The barrier electrodes 450 are arranged to be bent in every nine sub-pixels. Therefore, the barriers 461 formed when a predetermined voltage is applied to the barrier electrodes 450 are bent like the barrier electrodes 450. The barrier electrodes 450 are bent in every nine sub-pixels. However, the barrier electrodes 450 may be bent in every number of pixels other than nine or a period of bending may vary as indicated by the embodiment of the stripe electrodes shown in FIG. 9.

Figure 17:
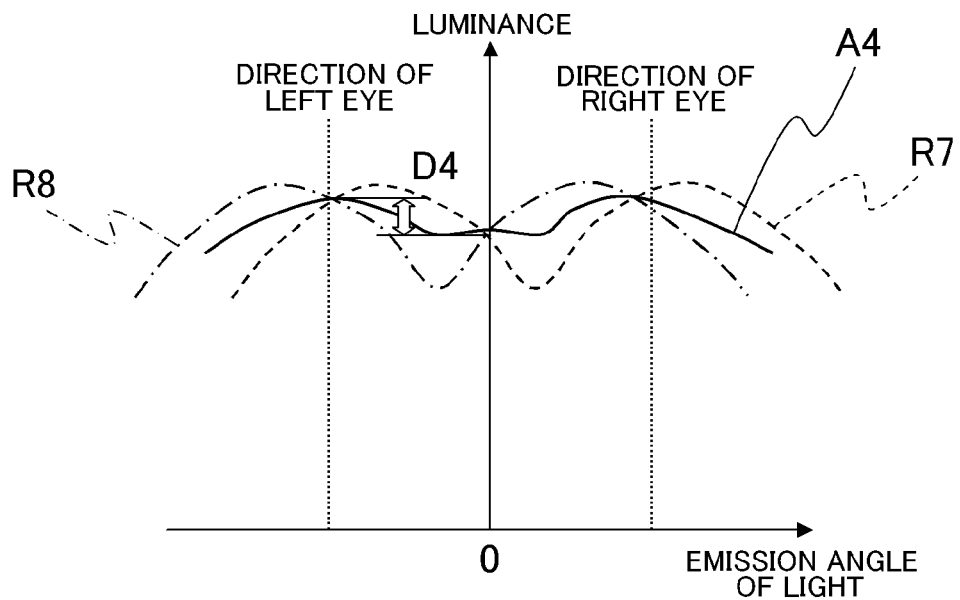
FIG. 17 is a graph showing luminance R7 of light emitted from a region r7 of a pixel for left eye and a pixel for right eye shown in FIG. 16 and a luminance R8 of light emitted from a region r8 of a pixel for left eye and a pixel for right eye shown in FIG. 16.

FIG. 17 is a graph showing luminance R7 of light emitted from a region r7 of the pixel for left eye 151 and the pixel for right eye 152 shown in FIG. 16 and luminance R8 of light emitted from a region r8 of the pixel for left eye 151 and the pixel for right eye 152 shown in FIG. 16. As shown in the graph, the luminance R7 and the luminance R8 have peaks in positions where emission angles are different. A luminance difference D4 can be further reduced at average luminance A4 of the luminance R7 and the luminance R8. In other words, center positions in the lateral direction, which are vertexes of luminance in the lateral direction of an image of the pixels for right eye and an image of the pixels for left eye, are respectively positions different in the lateral direction in different positions in the screen longitudinal direction. Therefore, with the three dimensional display device according to the fourth embodiment, it is possible to reduce 3D moiré in three dimensional image display.

Fifth Embodiment

A fifth embodiment of the present invention is explained. The configuration of a three dimensional display device according to the fifth embodiment is the same as the configuration shown in FIGS. 1 and 2 in the first embodiment. The configuration of a liquid crystal module is the same as the configuration of the liquid crystal module 330 shown in FIG. 15 in the fourth embodiment. Therefore, redundant explanation of the configurations is omitted.

Figure 18:
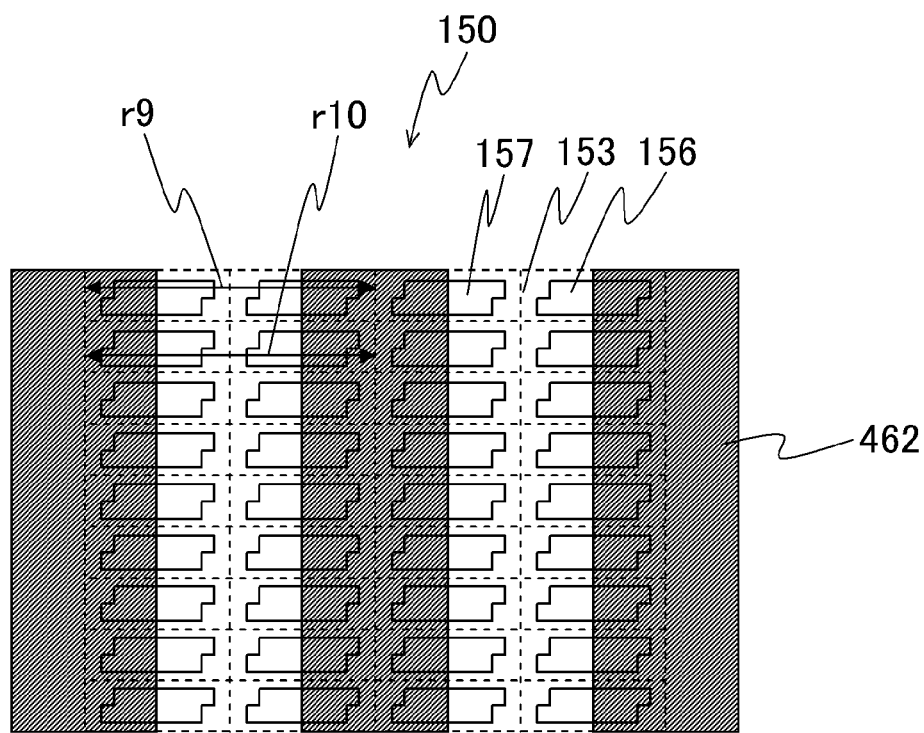
FIG. 18 is a diagram schematically showing a part of a pixel layer and barriers formed by barrier electrodes according to a fifth embodiment in a visual field from the front of a screen.

FIG. 18 is a diagram schematically showing a part of the pixel layer 150 and barriers 462 formed by the barrier electrodes 450 according to the fifth embodiment. As shown in FIG. 18, in this embodiment, the barrier electrodes 450 are linear and not bent. Therefore, the barriers 462 formed by the barrier electrodes 450 are not bent either. Instead, the shape of respective electrodes of the pixels for left eye 156 and the pixels for right eye 157 is a shape obtained by shifting laterally-long upper and lower rectangles from each other in the lateral direction and combining the rectangles. Lateral direction positions of two sides forming longitudinal direction ends of a pixel shape are different from each other. Sides forming lateral direction ends are bent in a hook shape. Such a pixel shape may be formed by an electrode shape of the liquid crystal display panel 131, may be formed by a color filter shape, or may be formed by both of the electrode shape and the color filter shape.

Figure 19:
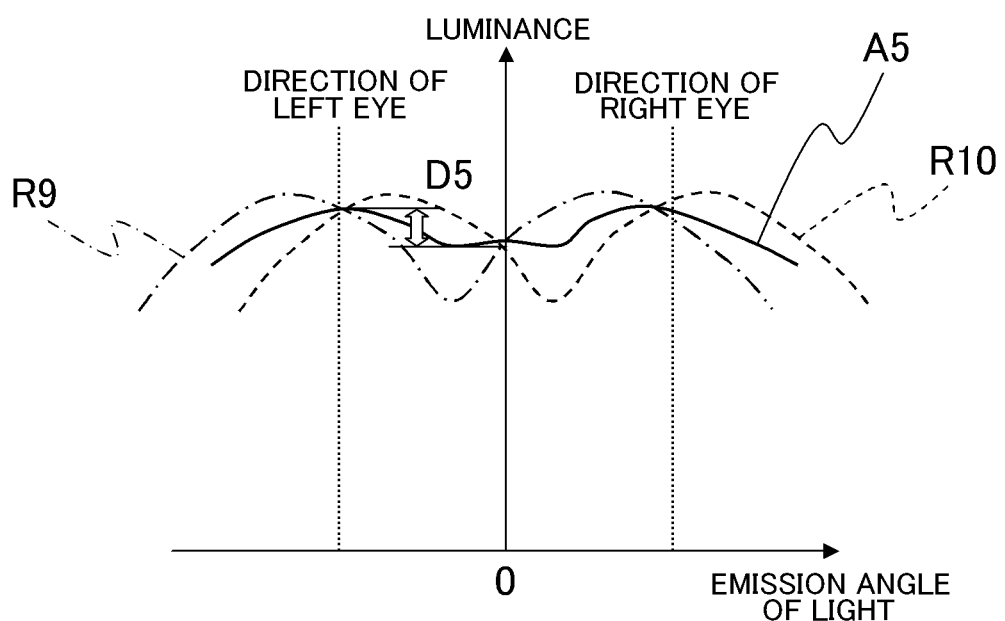
FIG. 19 is a graph showing luminance R9 of light emitted from a region r9 in an upper part of a pixel for left eye and a pixel for right eye shown in FIG. 18 and luminance R10 of light emitted from a region r10 in a lower part of a pixel for left eye and a pixel for right eye shown in FIG. 18.
Figure 20:
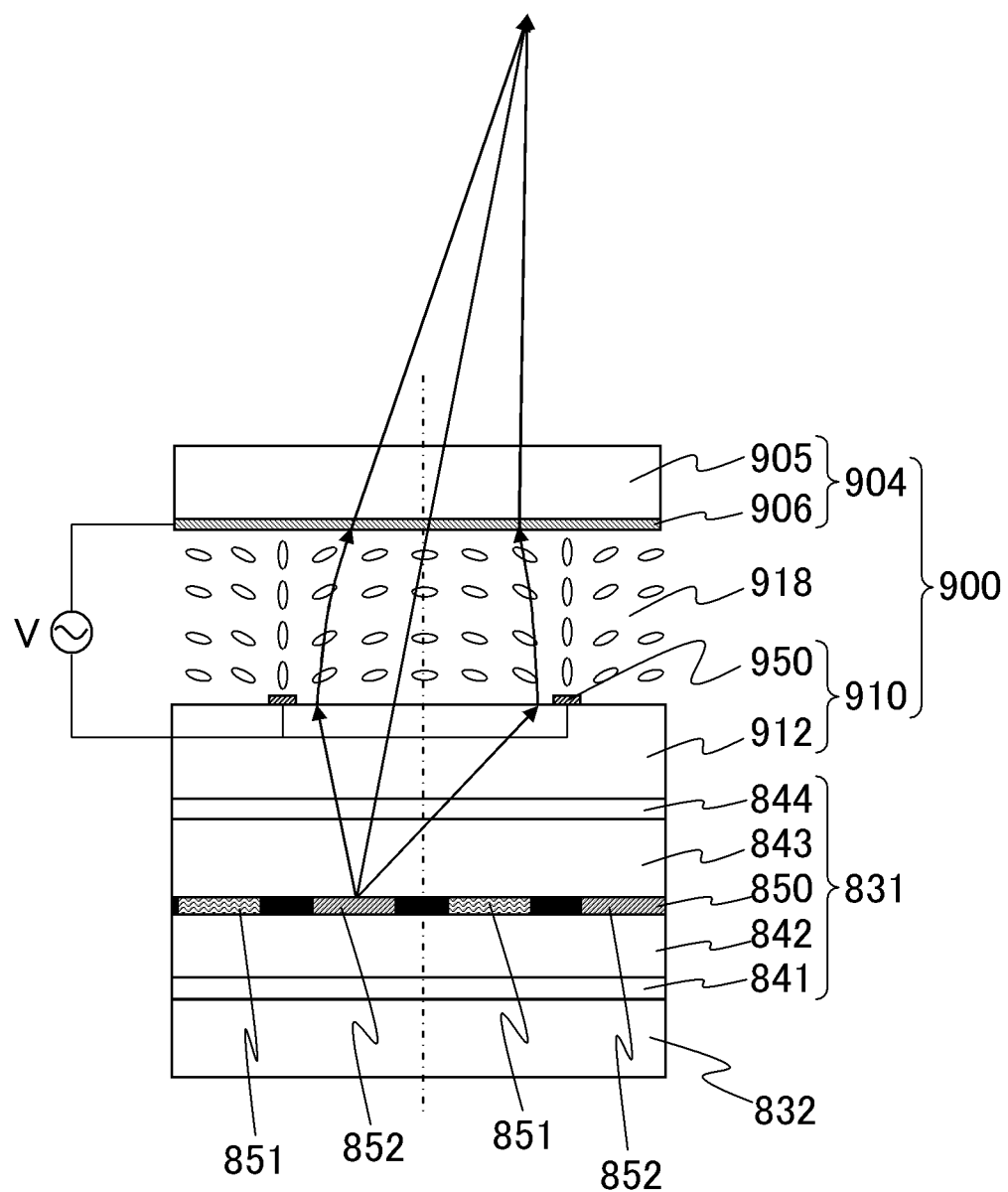
FIG. 20 is a diagram for explaining a principle of three dimensional display performed using a liquid crystal lens.
Figure 21:
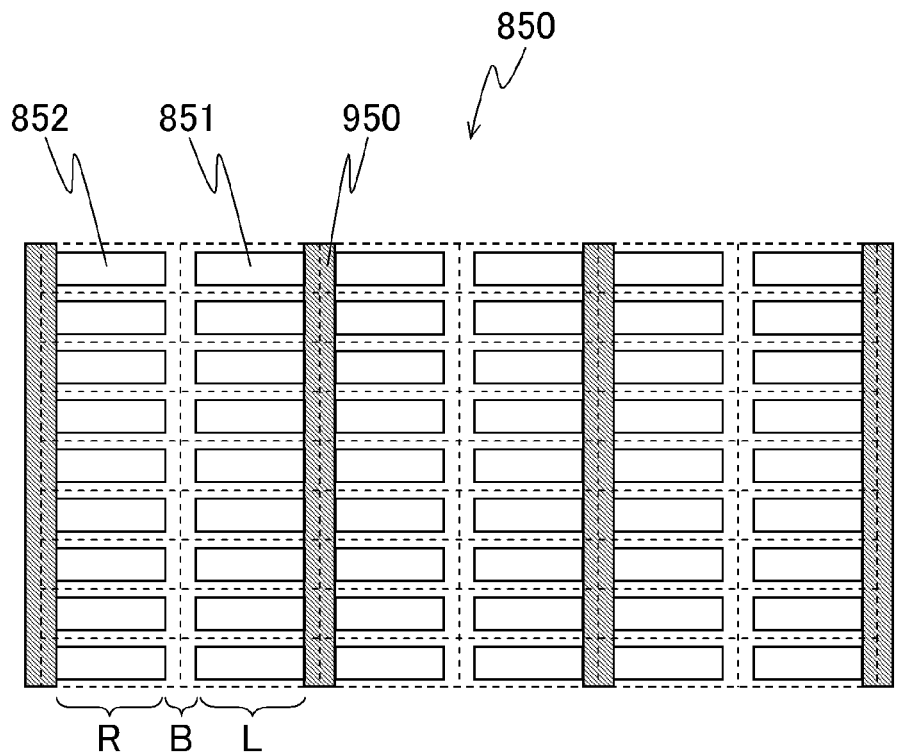
FIG. 21 is a diagram schematically showing a part of a pixel layer and stripe electrodes in a visual field from the front of a screen.
Figure 22:
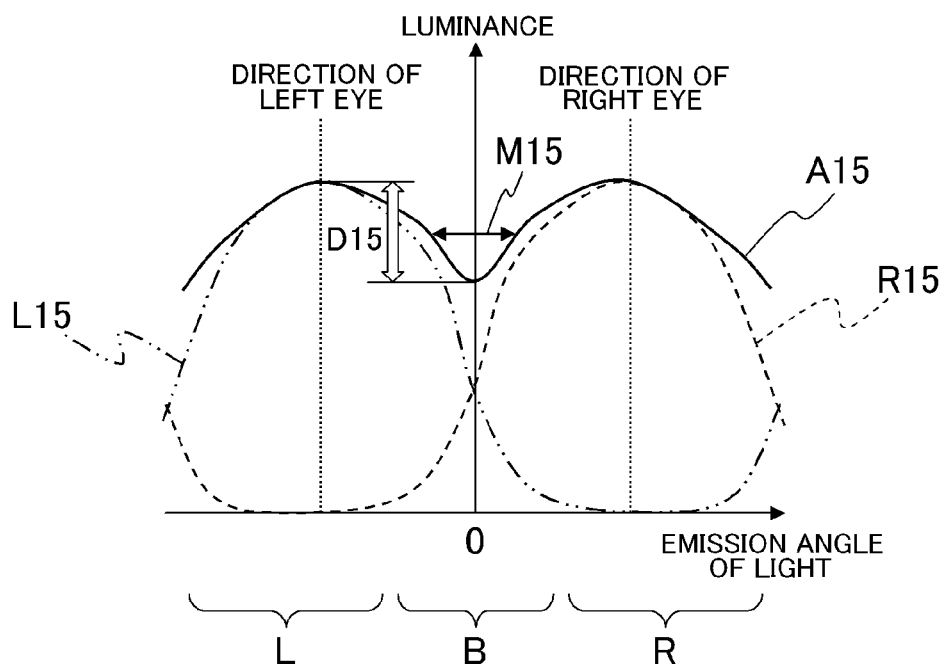
FIG. 22 is a graph showing a distribution of luminance obtained when an image displayed on a three dimensional display device is viewed from an observer side.

FIG. 19 is a graph showing luminance R9 of light emitted from a region r9 in an upper part of the pixel for left eye 156 and the pixel for right eye 157 shown in FIG. 18 and luminance R10 of light emitted from a region r10 in a lower part of the pixel for left eye 156 and the pixel for right eye 157 shown in FIG. 18. As shown in the graph, the luminance R9 and the luminance R10 have peaks in positions where emission angles are different. A luminance difference D5 can be further reduced at average luminance A5 of the luminance R9 and the luminance R10.

Therefore, even if the pixel shape is the shape in which the lateral direction positions of the two sides forming the longitudinal direction end are different as shown in FIG. 18, left and right positions of lights emitted from upper parts of the pixels and lights emitted from lower parts of the pixels are different. Therefore, it is possible to obtain effects same as the effects obtained when the liquid crystal lens is shifted to the left and right. In other words, center positions in the lateral direction, which are vertexes of luminance in the lateral direction of an image of the pixels for right eye and an image of the pixels for left eye, are respectively positions different in the lateral direction in different positions in the screen longitudinal direction. Therefore, with the three dimensional display device according to the fifth embodiment, it is possible to reduce 3D moiré in three dimensional image display.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A three dimensional image display device comprising:
a display panel on which rows of pixels for right eye and rows of pixels for left eye extending in a screen longitudinal direction are alternately arranged in a screen lateral direction, the display panel planarly displaying an image for three dimensional display using the rows of the pixels for right eye and the rows of the pixels for left eye; and a parallax forming liquid crystal panel arranged in parallel to the display panel on a display direction side of the display panel and for forming a parallax in an image of the rows of the pixels for right eye and an image of the rows of the pixels for left eye displayed by the display panel, the parallax forming liquid crystal panel comprising an electrode for orienting a liquid crystal, wherein lateral direction center positions, which are vertexes of luminance in a lateral direction of an image of the pixels for right eye and an image of the pixels for left eye, where the image for three dimensional display is visually sensed through the parallax forming liquid crystal panel, are respectively positions shifted in the lateral direction in different positions in the screen longitudinal direction, the electrode is configured to cover a gap between the row of pixels for right eye and the row of pixels for left eye adjacent to each other, the electrode extends in a first oblique direction with respect to the screen longitudinal direction for a first number of pixels, bends to a second oblique direction opposed to the first oblique direction with respect to the screen longitudinal direction, and extends in the second oblique direction for a second number of pixels, and the first number is different from the second number.

2. The three dimensional image display device according to claim 1, wherein the parallax forming liquid crystal panel forms a lenticular lens by orienting liquid crystal and forms a parallax in the image for three dimensional display.

3. The three dimensional image display device according to claim 1, wherein the parallax forming liquid crystal panel forms a parallax in the image for three dimensional display by orienting the liquid crystal to thereby form a parallax barrier.

* * * * *